US012749508B1

(12) United States Patent
Toyosaki et al.

(10) Patent No.: US 12,749,508 B1
(45) Date of Patent: Sep. 29, 2026

(54) MAGNETIC DISK DEVICE AND CONTROL METHOD

(71) Applicants: Kabushiki Kaisha Toshiba, Kawasaki (JP); Toshiba Electronic Devices & Storage Corporation, Kawasaki (JP)

(72) Inventors: Tatsuhiko Toyosaki, Yokohama (JP); Takao Furuhashi, Kawasaki (JP); Shuuichi Kojima, Tokyo (JP); Kaori Kimura, Yokohama (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/294,982

(22) Filed: Aug. 8, 2025

(30) Foreign Application Priority Data

Jun. 9, 2025 (JP) ................................ 2025-095773

(51) Int. Cl.
*G11B 23/50* (2006.01)
*G11B 5/00* (2006.01)

(52) U.S. Cl.
CPC .... *G11B 23/505* (2013.01); *G11B 2005/0021* (2013.01)

(58) Field of Classification Search
CPC .......... G11B 23/505; G11B 2005/0021; G11B 5/6011
See application file for complete search history.

(56) References Cited

U.S. PATENT DOCUMENTS

| | | | | |
|---|---|---|---|---|
| 9,042,047 | B1 | 5/2015 | Dube | |
| 9,460,739 | B1 | 10/2016 | Marchon et al. | |
| 9,728,217 | B2 * | 8/2017 | Yoshida | G11B 5/73921 |
| 10,199,067 | B1 | 2/2019 | Gan et al. | |
| 11,023,352 | B2 | 6/2021 | Gaertner et al. | |
| 12,300,280 | B1 * | 5/2025 | Suzuki | G11B 5/455 |
| 12,347,475 | B2 * | 7/2025 | Kim | G11C 11/1697 |
| 2017/0221511 | A1 | 8/2017 | Dai et al. | |

FOREIGN PATENT DOCUMENTS

JP 5795872 B2 10/2015

* cited by examiner

*Primary Examiner* — Andrew Sasinowski
(74) *Attorney, Agent, or Firm* — Kim & Stewart LLP

(57) ABSTRACT

A magnetic disk device is a magnetic disk device in which data write is performed by a thermal assist method, the magnetic disk device including: a magnetic disk that includes a plurality of tracks; and a controller that controls the magnetic disk device, wherein the controller measures, every a first period, a deviation amount from a reference height of a surface of the magnetic disk with respect to a track in which a duty ratio is equal to or greater than a predetermined value, the duty ratio being a time ratio at which data write is performed per unit time, among the plurality of tracks, and flattens the surface of the magnetic disk in a case where the deviation amount becomes equal to or greater than a first value.

17 Claims, 8 Drawing Sheets

MAGNETIC DISK DEVICE AND CONTROL METHOD

CROSS-REFERENCE TO RELATED APPLICATIONS

This application is based upon and claims the benefit of priority from Japanese Patent Application No. 2025-095773, filed on Jun. 9, 2025; the entire contents of which are incorporated herein by reference.

FIELD

Embodiments described herein relate generally to a magnetic disk device and a control method.

BACKGROUND

In a magnetic disk device in which data write is performed by a thermal assist method, unevenness may occur on a surface of a magnetic disk due to heat at the time of data write. When such unevenness is left, the operation of the magnetic head may be hindered.

DETAILED DESCRIPTION

A magnetic disk device of an embodiment is a magnetic disk device in which data write is performed by a thermal assist method, the magnetic disk device including: a magnetic disk that includes a plurality of tracks; and a controller that controls the magnetic disk device, wherein the controller measures, every a first period, a deviation amount from a reference height of a surface of the magnetic disk with respect to a track in which a duty ratio is equal to or greater than a predetermined value, the duty ratio being a time ratio at which data write is performed per unit time, among the plurality of tracks, and flattens the surface of the magnetic disk in a case where the deviation amount becomes equal to or greater than a first value.

Hereinafter, an embodiment of the present invention will be described in detail with reference to the drawings. Note that the present invention is not limited by the embodiment described below. In addition, constituent elements in the embodiment described below include those that can be easily assumed by those skilled in the art or those that are substantially the same.

(Configuration Example of Magnetic Disk Device)

Figure 1:
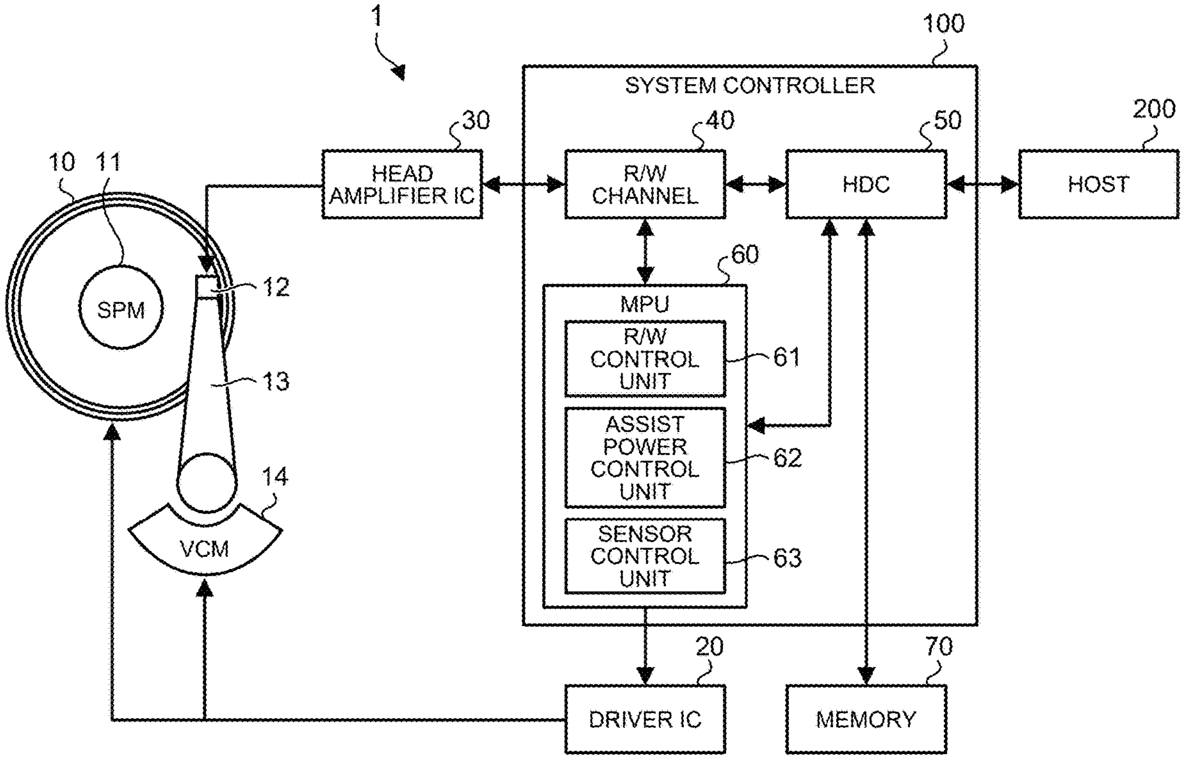
FIG. 1 is a schematic diagram illustrating an example of a configuration of a magnetic disk device according to an embodiment.

FIG. 1 is a schematic diagram illustrating an example of a configuration of a magnetic disk device 1 according to the embodiment. The magnetic disk device 1 of the embodiment is configured as, for example, a hard disk drive (HDD). However, the magnetic disk device 1 of the embodiment may be another magnetic disk device such as a hybrid HDD.

As illustrated in FIG. 1, the magnetic disk device 1 of the embodiment includes a magnetic disk 10, a spindle motor (SPM) 11, a magnetic head 12, an arm 13, a voice coil motor (VCM) 14, a driver integrated circuit (IC) 20, a head amplifier IC 30, a memory 70, and a system controller 100.

The spindle motor 11 holds the magnetic disk 10 and rotates the magnetic disk 10 around a spindle, which is not illustrated. A recording layer capable of recording data is formed in the magnetic disk 10. More specifically, the magnetic disk 10 is provided with a plurality of concentric tracks centered on the rotation center by the spindle motor 11, and data and the like can be written to these tracks.

In addition, the magnetic disk 10 is provided with a plurality of zones grouped for a predetermined number of tracks among the plurality of tracks. That is, the magnetic disk 10 is divided into a plurality of zones in a radial direction.

The magnetic head 12 is mounted on a distal end of the arm 13. When the voice coil motor 14 connected to the other end is driven, the arm 13 moves the magnetic head 12 to a predetermined position of the magnetic disk 10. As a result, the magnetic head 12 can be brought accessibly close to a recording surface of the magnetic disk 10. That is, the magnetic head 12 can thus record (write) data and reproduce (read) data with respect to the recording surface of the magnetic disk 10.

In addition, as will be described in detail below, the magnetic head 12 includes a sensor capable of measuring a distance between the magnetic head 12 and the magnetic disk 10.

Note that the magnetic disk device 1 may include a plurality of magnetic disks 10 held in parallel in a longitudinal direction of the spindle motor 11, and the recording surfaces of the magnetic disks 10 may be provided on both surfaces of the magnetic disks 10, for example. In this case, the magnetic disk device 1 may include a plurality of magnetic heads 12 such that the number of magnetic heads 12 corresponds to the number of recording surfaces of the magnetic disks 10.

The system controller 100 is achieved by using, for example, a large scale integration (LSI) called a system-on-chip (SoC) in which a plurality of elements is integrated on a single chip. The system controller 100 is connected to a host 200 and controls the entire magnetic disk device 1 based on a command from the host 200. The host 200 is configured as, for example, a processor, a personal computer, or a server.

The system controller 100 includes a read/write (R/W) channel 40, a hard disk controller (HDC) 50, and a micro processor (micro processing unit (MPU)) 60.

The R/W channel 40, the HDC 50, and the MPU 60 are electrically connected to each other, and the system controller 100 is electrically connected to the driver IC 20, the head amplifier IC 30, and the memory 70.

The R/W channel 40 is a signal processing circuit that processes a signal related to reading/writing (read/write). The R/W channel 40 includes a read channel for executing signal processing of read data and a write channel for executing signal processing of write data. The read channel converts a read signal into digital data and demodulates the read data from the digital data. The write channel encodes the write data transferred from the HDC 50 and transfers the encoded write data to the head amplifier IC 30.

The HDC 50 constitutes an interface between the magnetic disk device 1 and the host 200, and executes transfer control of the read data and the write data. That is, the HDC 50 functions as a host interface controller that transmits and receives signals to and from the host 200. Examples of the signal transferred from the host 200 include commands such as a write command and a read command. The HDC 50 transmits these commands received from the host 200 to the MPU 60.

As described above, in response to various instructions from the host 200, the HDC 50 controls writing of data to the magnetic disk 10 and reading of data from the magnetic disk 10 via the magnetic head 12, the head amplifier IC 30, the R/W channel 40, and the MPU 60.

The MPU 60 as a controller is a main controller of the magnetic disk device 1, and includes a read/write (R/W) control unit 61, an assist power control unit 62, and a sensor control unit 63. The MPU 60 executes processing by the R/W control unit 61, the assist power control unit 62, the sensor control unit 63, and the like on firmware. Note that the MPU 60 may include the R/W control unit 61, the assist power control unit 62, the sensor control unit 63, and the like as circuits.

The R/W control unit 61 controls data write processing and read processing in accordance with a command or the like from the host 200. More specifically, for example, when receiving a write command from the host 200, the R/W control unit 61 executes write processing of writing data to a predetermined region of the magnetic disk 10. In addition, for example, when receiving a read command from the host 200, the R/W control unit 61 executes read processing of reading data from a predetermined region of the magnetic disk 10.

At this time, the R/W control unit 61 controls the VCM 14 via the driver IC 20, positions the magnetic head 12 at a target position of the magnetic disk 10, and executes the write processing or the read processing.

Here, the magnetic disk device 1 of the embodiment performs data write processing by, for example, a thermal assist method. In the thermal assist method, writing to a medium having high thermal magnetic stability is enabled by heating a writing region of the magnetic disk 10 having a high bit density. The writing region is heated by, for example, near-field light obtained by converting laser light. The magnetic head 12 described above is provided with a near-field light generation element that converts laser light into near-field light.

The assist power control unit 62 controls the head amplifier IC 30 so as to supply the assist power to the configuration including the near-field light generation element provided in the magnetic head 12.

The sensor control unit 63 controls the above-described sensor provided in the magnetic head 12 to measure the distance between the magnetic head 12 and the magnetic disk 10.

The driver IC 20 controls driving of the spindle motor 11 and the voice coil motor 14 according to control of the MPU 60. When the spindle motor 11 is driven, the magnetic disk 10 held by the spindle motor 11 rotates as described above. When the voice coil motor 14 is driven, the magnetic head 12 is positioned at a target track on the magnetic disk 10.

The head amplifier IC 30 supplies a write signal corresponding to the write data supplied from the R/W channel 40 to the magnetic head 12. In addition, the head amplifier IC 30 controls the output of the laser light emitted to the near-field light generation element of the magnetic head 12 according to an instruction from the assist power control unit 62. In addition, the head amplifier IC 30 amplifies the read signal output from the magnetic head 12 and transmits the amplified read signal to the R/W channel 40.

The memory 70 is configured to include a volatile memory, a nonvolatile memory, and the like. As an example, the memory 70 includes buffer memory including dynamic random access memory (DRAM), and flash memory.

(Configuration Example of Magnetic Head)

Figure 2:
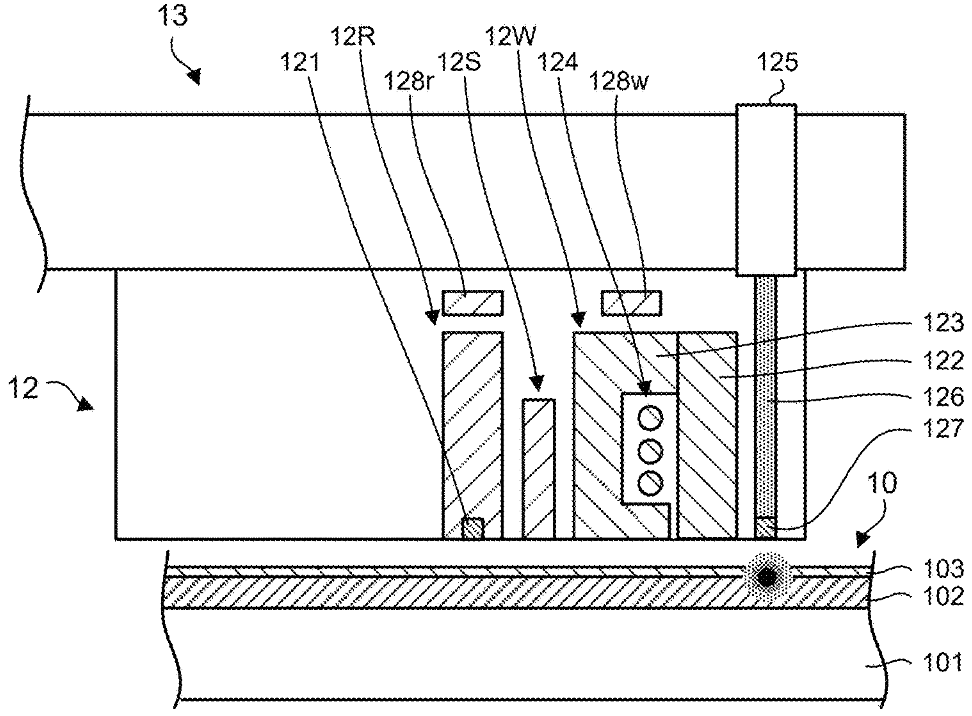
FIG. 2 is a schematic diagram illustrating an example of a configuration of a magnetic head according to the embodiment.

FIG. 2 is a schematic diagram illustrating an example of a configuration of the magnetic head 12 according to the embodiment. As illustrated in FIG. 2, the magnetic head 12 is held by the arm 13 so as to face a recording layer 102 of the magnetic disk 10, and includes a write head 12W, a read head 12R, a head disk interface (HDI) sensor 12S, and heaters 128*w* and 128*r*.

The magnetic disk 10 includes a substrate 101 and the recording layer 102 provided on the substrate 101, and the recording layer 102 is covered with a lubricant 103 applied to the surface of the magnetic disk 10. The lubricant 103 is, for example, an organic solvent such as perfluoropolyether (PFPE).

The read head 12R includes a read element 121 that reads data from the recording layer 102 provided on the substrate 101 of the magnetic disk 10.

The write head 12W includes a main magnetic pole 122, an auxiliary magnetic pole 123, a coil 124, a laser diode 125, a waveguide 126, and a near-field light generation element 127.

The main magnetic pole 122 is made of a high-permeability material, and generates a perpendicular magnetic field with respect to the recording layer 102 coated with the lubricant 103 of the magnetic disk 10. The auxiliary magnetic pole 123 is magnetically joined to the main magnetic pole 122 to cause a magnetic flux to flow through the main magnetic pole 122. The coil 124 is wound around the auxiliary magnetic pole 123 to cause a magnetic flux to flow through the main magnetic pole 122. In this manner, by generating a magnetic field in the main magnetic pole 122 by the coil 124, data can be written to the recording layer 102 of the magnetic disk 10.

The laser diode 125 is provided, for example, in the arm 13, and emits laser light toward the near-field light generation element 127 below. The waveguide 126 is provided between the laser diode 125 and the near-field light generation element 127, and guides the laser light emitted from the laser diode 125 to the near-field light generation element 127. The near-field light generation element 127 converts the laser light from the laser diode 125 into near-field light, and irradiates the recording layer 102 of the magnetic disk 10 with the near-field light.

The near-field light is localized light generated in the vicinity of a microstructure equal to or less than an optical wavelength, and an optical spot diameter thereof does not depend on the optical wavelength and is determined by a dimension of the microstructure. By using the near-field light, a micro optical spot can be generated, and a micro local region of the magnetic disk 10 can be heated.

As described above, a recording medium having high magnetic stability is used for the recording layer 102 of the magnetic disk 10 in order to increase the bit density. By heating a micro writing region of the recording layer 102 at the time of write of the data, the coercive force of the recording medium having high magnetic stability as described above is temporarily weakened, and data can be written to the magnetic disk 10.

The HDI sensor 12S is configured as, for example, a resistance type temperature sensor or the like including a resistor element, and is provided on a surface of the magnetic head 12 facing the magnetic disk 10, for example, between the write head 12W and the read head 12R.

When the magnetic head 12 and the magnetic disk 10 come into contact with each other, minute heat is generated by friction between the magnetic head 12 and the magnetic disk 10, and a resistance value of the resistor element included in the HDI sensor 12S changes. The HDI sensor 12S senses contact between the magnetic head 12 and the magnetic disk 10 by a change in the resistance value of the resistor element.

Based on the height position of the magnetic head 12 at this time, the flying amount of the magnetic head 12 with respect to the magnetic disk 10 in each main operation of the magnetic head 12 is appropriately adjusted. Contact sensing between the magnetic head 12 and the magnetic disk 10 by the HDI sensor 12S for adjusting the flying amount of the magnetic head 12 is also referred to as touch-down measurement or the like.

Touch-down measurement and adjustment of the flying amount of the magnetic head 12 are performed, for example, in pre-shipment inspection of the magnetic disk device 1.

In addition, in the magnetic disk device 1 of the embodiment, the HDI sensor 12S is also used to sense the unevenness of the surface of the magnetic disk 10. As described below, by repeating data write in a predetermined region of the magnetic disk 10, unevenness may occur on the surface of the magnetic disk 10. The HDI sensor 12S is configured to be able to measure the presence or absence, size, and the like of unevenness on the surface of the magnetic disk 10 based on the height of the contact position between the magnetic head 12 and the magnetic disk 10.

In estimating the size of the unevenness on the surface of the magnetic disk 10, for example, the unevenness measurement of the magnetic disk 10 in an initial state is performed in advance. The above-described sensor control unit 63 estimates the size of unevenness newly generated on the surface of the magnetic disk 10 exceeding a predetermined standard on the basis of the unevenness measurement result of the magnetic disk 10 in the initial state and the unevenness measurement result of the magnetic disk 10 after data write is performed.

The heaters 128_w_ and 128_r_ are provided in the vicinity of the write head 12W and the read head 12R, respectively. By supplying predetermined electric power to these heaters 128_w_ and 128_r_, the magnetic head 12 is heated and expanded, and in a case where the flying amount of the magnetic head 12 is constant, the distance between the lower surface of the magnetic head 12 and the surface of the magnetic disk 10 can be changed.

These heaters 128_w_ and 128_r_ are configured to be able to supply predetermined electric power independently of each other, and can adjust the protrusion amount of the lower surface of the magnetic head 12 at a predetermined position by individually controlling the heating temperature by the heaters 128_w_ and 128_r_. This state is illustrated in FIGS. 3A to 3D.

FIGS. 3A to 3D are schematic diagrams illustrating functional examples of the heaters 128_w_ and 128_r_ of the magnetic head 12 according to the embodiment. In FIGS. 3A to 3D, the magnetic head 12 and the magnetic disk 10 are illustrated in a simplified manner.

Figure 3A:
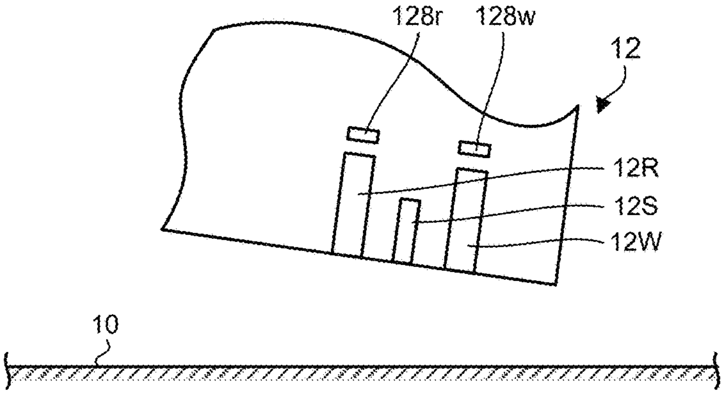
FIGS. 3A to 3D are schematic diagrams illustrating functional examples of a heater of the magnetic head according to the embodiment.

As illustrated in FIG. 3A, when both heaters 128_w_ and 128_r_ are off, the magnetic head 12 is not thermally expanded, and flatness of the lower surface of the magnetic head 12 is maintained. However, since the magnetic head 12 is maintained at a predetermined flying amount and brought close to the surface of the magnetic disk 10, the magnetic head 12 and the magnetic disk 10 may not be in a perfect equilibrium state.

In the example of FIG. 3A, the magnetic head 12 is brought close to the surface of the magnetic disk 10 with a predetermined inclination. As a result, the distance between the read head 12R included in the magnetic head 12 and the magnetic disk 10>the distance between the HDI sensor 12S and the magnetic disk 10>the distance between the write head 12W and the magnetic disk 10 is satisfied.

In this manner, the distance between the magnetic head 12 and the magnetic disk 10 when both the heaters 128_w_ and 128_r_ are off is also referred to as a reference flying amount or the like.

Figure 3B:
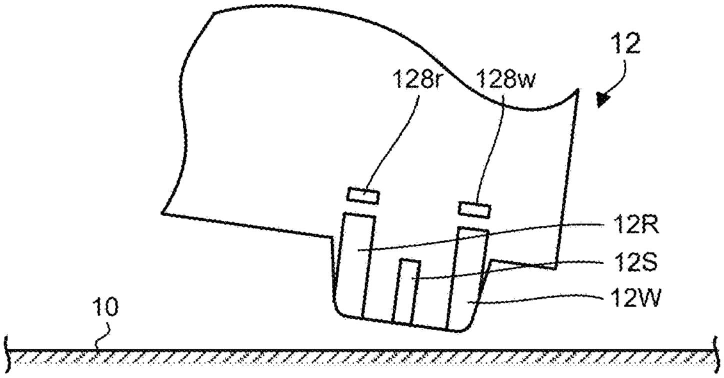

As illustrated in FIG. 3B, in a case where the heaters 128_w_ and 128_r_ are activated so that equal electric power is supplied to both of the heaters 128_w_ and 128_r_ and the heating temperatures become equal, the protrusion amount of the lower surface of the magnetic head 12 from the initial state becomes substantially equal.

Accordingly, in the example of FIG. 3B, while the differences in the distance between a read head 12E and the magnetic disk 10, the distance between the HDI sensor 12S and the magnetic disk 10, and the distance between the write head 12W and the magnetic disk 10 are maintained in the state of FIG. 3A, the distances between each of the read head 12R, the HDI sensor 12S, and the write head 12W, and the magnetic disk 10 are closer than those in the example of FIG. 3A.

Figure 3C:
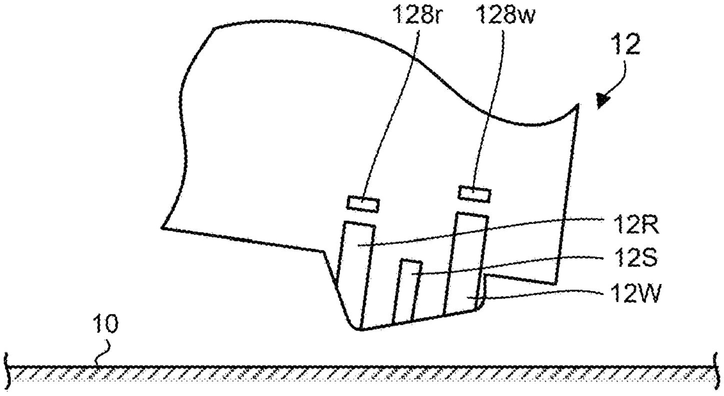

As illustrated in FIG. 3C, when the electric power supplied to the heater 128_r_ is higher than the electric power supplied to the heater 128_w_ and the heating temperature of the heater 128_r_ is higher than the heating temperature of the heater 128_w_, the protrusion amount of the lower surface of the magnetic head 12 from the initial state satisfies, for example, the position in the vicinity of the read head 12R>the position in the vicinity of the HDI sensor 12S>the position in the vicinity of the write head 12W.

Accordingly, in the example of FIG. 3C, the distance between the read head 12R and the magnetic disk 10<the distance between the HDI sensor 12S and the magnetic disk 10<the distance between the write head 12W and the magnetic disk 10 is satisfied, and the magnitude relationship between these distances is reversed from that in the example of FIG. 3A.

Figure 3D:
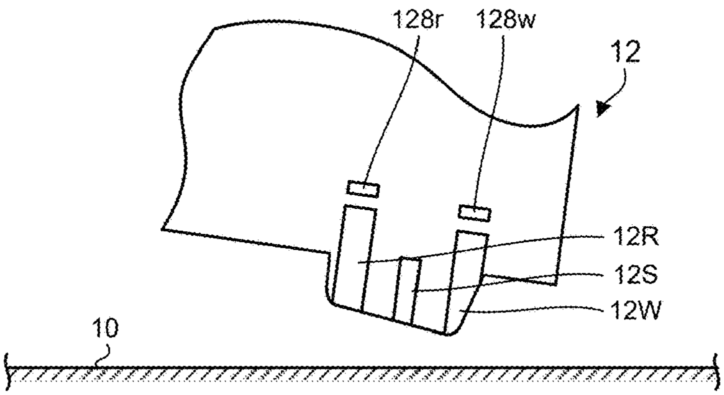

As illustrated in FIG. 3D, when the electric power supplied to the heater 128_w_ is higher than the electric power supplied to the heater 128_r_ and the heating temperature of the heater 128_w_ is higher than the heating temperature of the heater 128_r_, the protrusion amount of the lower surface of the magnetic head 12 from the initial state satisfies, for example, the position in the vicinity of the read head 12R<the position in the vicinity of the HDI sensor 12S<the position in the vicinity of the write head 12W.

Accordingly, in the example of FIG. 3D, the differences in the distance between the read head 12E and the magnetic disk 10, the distance between the HDI sensor 12S and the magnetic disk 10, and the distance between the write head 12W and the magnetic disk 10 are greater than those in the example of FIG. 3A, and the distance between the read head 12R and the magnetic disk 10>the distance between the HDI sensor 12S and the magnetic disk 10>the distance between the write head 12W and the magnetic disk 10 is satisfied.

As described above, the flying amount of the magnetic head 12 can be variously adjusted by variously adjusting the electric power supplied to the heaters 128w and 128r with respect to the reference flying amount illustrated in the example of FIG. 3A. In addition, at this time, by variously adjusting the ratio of electric power to be supplied to the heaters 128w and 128r, it is also possible to precisely adjust the flying amount at a predetermined position of the magnetic head 12, such as the position in the vicinity of the write head 12W, the position in the vicinity of the HDI sensor 12S, and the position in the vicinity of the read head 12R.

In the touch-down measurement described above, the electric power supplied to the heaters 128w and 128r when the magnetic head 12 and the magnetic disk 10 come into contact with each other is acquired and set as the reference electric power. In addition, when the flying amount of the magnetic head 12 is adjusted at the time of data write, data read, and measurement of the unevenness of the magnetic disk 10, appropriate electric power is supplied to the heaters 128w and 128r on the basis of the reference electric power.

Note that the appropriate flying amount at the time of data write, data read, and measurement of the unevenness of the magnetic disk 10 may be different from each other. Accordingly, in the touch-down measurement described above, it is preferable to measure the reference flying amount at each position such as the position in the vicinity of the write head 12W, the position in the vicinity of the HDI sensor 12S, and the position in the vicinity of the read head 12R. In addition, at the time of data write, data read, and measurement of the unevenness of the magnetic disk 10, it is preferable that the value of electric power and the ratio of electric power to be supplied to the heaters 128w and 128r are made different, and the magnetic head 12 is controlled at different flying amounts.

(Flattening Control Example of Magnetic Disk)

Next, a method of flattening control of the surface of the magnetic disk 10 by the magnetic disk device 1 of the embodiment will be described with reference to FIGS. 4A to 8C. First, a mechanism in which unevenness OB is generated on the surface of the magnetic disk 10 will be described with reference to FIGS. 4A to 5D.

FIGS. 4A to 5D are schematic diagrams illustrating a state in which the unevenness OB is generated on the surface of the magnetic disk 10 according to the embodiment.

Figure 4A:
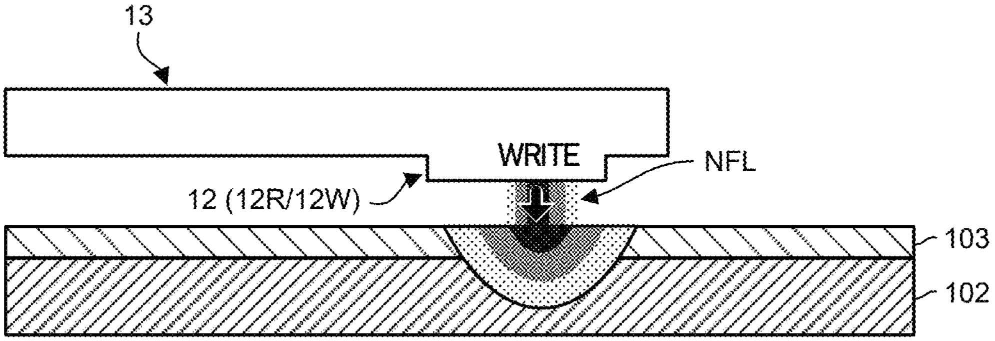
FIGS. 4A to 4C are schematic diagrams illustrating a state in which unevenness is generated on a surface of the magnetic disk according to the embodiment.

As illustrated in FIG. 4A, in the magnetic disk device 1 of the embodiment, when data write is performed at a predetermined position of the magnetic disk 10, the assist power control unit 62 supplies assist power to the laser diode 125 (see FIG. 2) to emit laser light, and the near-field light generation element 127 (see FIG. 2) generates near-field light NFL. Accordingly, a region of the magnetic disk 10 close to the magnetic head 12 is locally heated, and write of data by the write head 12W is also started.

Figure 4B:
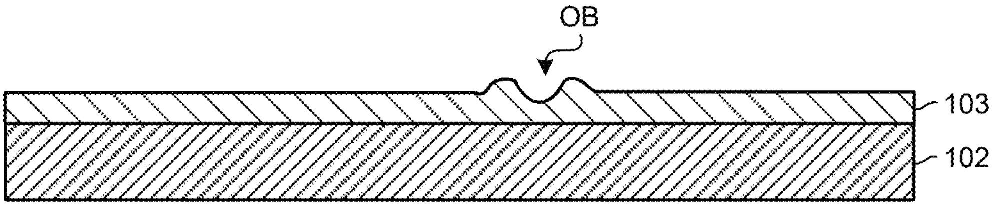

As illustrated in FIG. 4B, during write of data, the unevenness OB including at least one of a recess and a protrusion may be generated in the locally heated region of the magnetic disk 10 by irradiation with the laser light. Such unevenness OB increases as the heating time of the magnetic disk 10 in the portion increases.

Figure 4C:
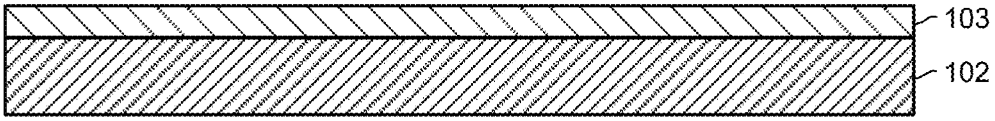

As illustrated in FIG. 4C, even in a case where the unevenness OB is once generated, the unevenness OB disappears and the surface of the magnetic disk 10 is naturally flattened again in a case where write of data on the portion is not performed for a predetermined time thereafter. The formation, temporal change, and natural disappearance of the unevenness OB on the surface of the magnetic disk 10 are confirmed by, for example, measuring the height of the surface of the magnetic disk 10 using an atomic force microscope (AFM) device.

On the other hand, as described below, in a case where data write is repeatedly performed at a predetermined frequency with respect to a predetermined position of the magnetic disk 10, the unevenness OB is continuously maintained and may continue to increase.

Figure 5A:
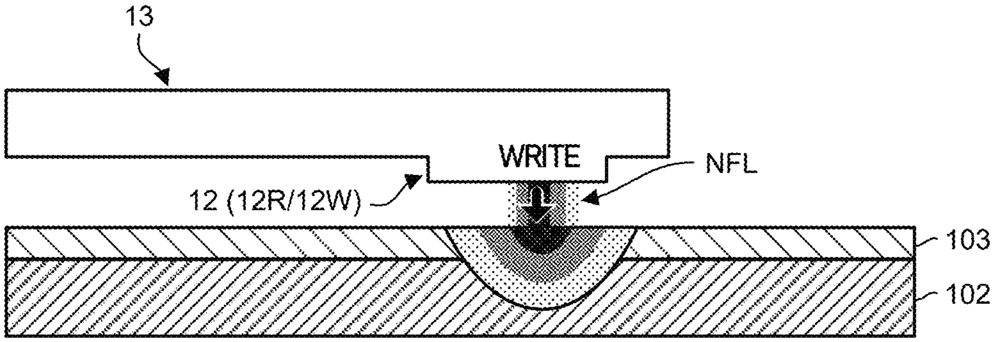
FIGS. 5A to 5D are schematic diagrams illustrating a state in which unevenness is generated on the surface of the magnetic disk according to the embodiment.

As illustrated in FIG. 5A, data write is performed while a target region of the magnetic disk 10 is locally heated by the near-field light NFL.

Figure 5B:
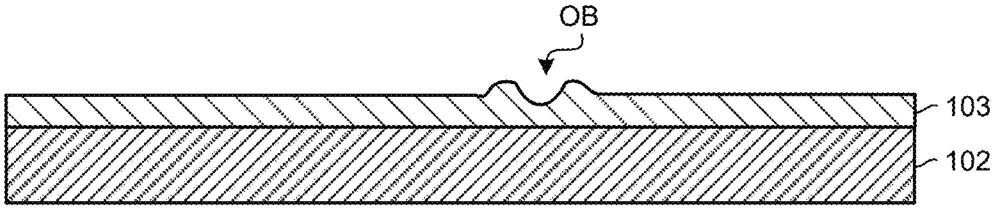

As illustrated in FIG. 5B, the unevenness OB is generated in a predetermined region of the magnetic disk 10 by data write.

Figure 5C:
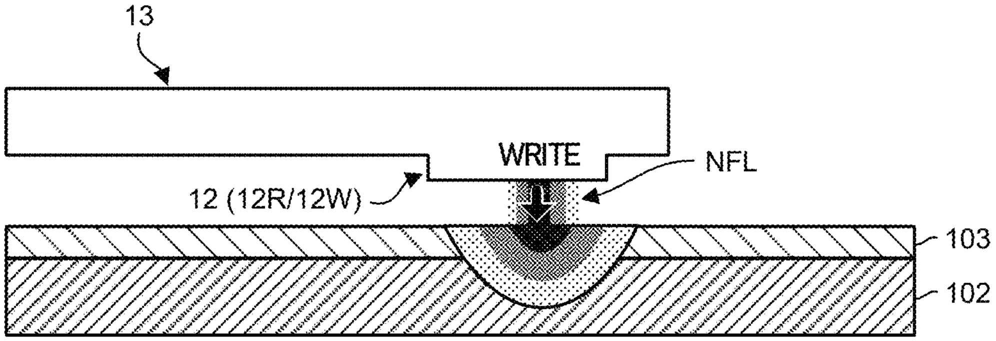

As illustrated in FIG. 5C, thereafter, before the unevenness OB naturally disappears, data write is further performed on the portion where the unevenness OB is formed.

Figure 5D:
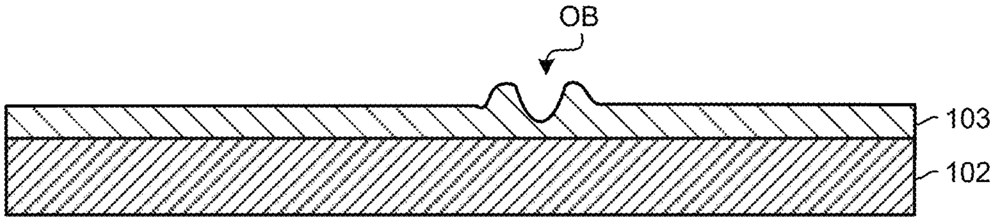

As illustrated in FIG. 5D, the size of the unevenness OB is further increased by such repetitive data write.

When the unevenness OB is equal to or greater than a predetermined size, accuracy of data write, data read, or the like by the magnetic head 12 is deteriorated, and data including many errors may be written or read. In addition, at the time of an operation such as data write, data read, or seek by the magnetic head 12, the magnetic head 12 and the protrusion portion of the unevenness OB come into contact with each other, and the operation of the magnetic head 12 may be hindered.

Therefore, in the magnetic disk device 1 of the embodiment, the formation status of the unevenness OB in each track of the magnetic disk 10 is monitored, and the flattening processing is performed on the unevenness OB of a predetermined size or more.

In monitoring the formation status of the unevenness OB, the magnetic disk device 1 of the embodiment measures the unevenness of the magnetic disk 10 in the initial state for each track using the HDI sensor 12S as described above. This is because the magnetic disk 10 is not in a completely flat state even in the initial state, and may locally have some unevenness.

Note that the unevenness measurement in the magnetic disk 10 in the initial state may be performed for each zone grouped for each predetermined number of tracks. As a result, it is possible to shorten the time for measuring the unevenness in the initial state and to improve the work efficiency.

In addition, when the size of the unevenness OB is actually measured, the size of the unevenness OB is estimated by subtracting the measurement result of the unevenness in the initial state from the measurement result of the unevenness of the magnetic disk 10 after data write. Here, the size of the unevenness OB is a deviation amount from the reference height derived from the measurement result of the unevenness in the initial state in each region of the magnetic disk 10. The reference height can be, for example, the height position of the surface in each region of the magnetic disk 10 in the initial state.

That is, in a case where the height position of the surface in the corresponding region of the magnetic disk 10 after data write is lower than the height position of the surface in the region of the magnetic disk 10 in the initial state, it means that the recess is generated in the region by data write, and this lowering amount is set as the deviation amount from the reference height. In addition, in a case where the height position of the surface in the corresponding region of the magnetic disk 10 after data write is higher than the height position of the surface in the region of the magnetic disk 10 in the initial state, it means that the protrusion is generated in the region by data write, and this rising amount is similarly set as the deviation amount from the reference height.

In addition, in a case where the unevenness measurement in the initial state is performed for each individual track, the size of the unevenness OB can be estimated by associating the unevenness in the initial state with the unevenness after data write in the corresponding track. In a case where the unevenness measurement in the initial state is performed for each zone, the unevenness in the initial state of the zone including the corresponding track is used as a representative value, and the size of the unevenness OB can be estimated by associating with the unevenness after data write in a predetermined track.

Note that, at the time of measuring the unevenness of the magnetic disk 10 in the initial state and measuring the unevenness of the magnetic disk 10 after data write, the magnetic head 12 is controlled to an appropriate flying amount so as to maximize the sensitivity of the HDI sensor 12S. Adjustment to an appropriate flying amount is performed by adjusting the value of electric power and the ratio of electric power to be supplied to the heaters 128*w* and 128*r*.

As will be described in detail below, the flattening of the unevenness OB is performed, for example, by irradiation with weak laser light by the laser diode 125, conversion into near-field light by the near-field light generation element 127, and heating of the magnetic disk 10 by the near-field light. In the magnetic disk device 1 of the embodiment, using the magnetic disk 10 in the initial state, the intensity of the laser light used for flattening the unevenness OB, the flying amount of the magnetic head 12 at the time of heating the magnetic disk 10 using the laser light, and the like are optimized in advance. This is because the appropriate flying amount of the magnetic head 12 may be different not only at the time of data write, data read, and measurement of the unevenness of the magnetic disk 10, but also at the time of flattening processing on the magnetic disk 10.

The optimization of the flattening condition of the unevenness OB and the optimization of the condition for maximizing the sensitivity of the HDI sensor 12S described above are performed, for example, by forming pseudo-unevenness OB on the magnetic disk 10 in the initial state and then evaluating the measurement accuracy and the removal performance of the pseudo-unevenness OB at various laser light intensities, various flying amounts, and the like.

The pseudo-unevenness OB can be formed, for example, by heating the magnetic disk 10 with near-field light converted from laser light under conditions equivalent to those at the time of write. At this time, by suppressing the size of the unevenness OB to a certain size or less, it is possible to suppress interference between the magnetic head 12 and the magnetic disk 10 due to the protrusion or the like of the unevenness OB.

In a predetermined region including the unevenness OB formed in this manner, the unevenness measurement by the HDI sensor 12S is repeatedly performed in a state where the value of electric power and the ratio of electric power to be supplied to the heaters 128*w* and 128*r* are variously changed to change the flying amount, and the measurement condition that maximizes the sensitivity of the HDI sensor 12S, that is, the condition of the flying amount of the magnetic head 12 is determined.

More specifically, the flying amount of the magnetic head 12 at which the sensitivity of the HDI sensor 12S is maximized is determined, for example, by performing measurement by the HDI sensor 12S before and after the formation of the unevenness OB at various electric power ratios illustrated in FIGS. 3A to 3D described above. That is, the condition of electric power ratio under which the difference between the measurement values before and after the formation of the unevenness OB is the maximum is selected as the measurement condition for maximizing the sensitivity of the HDI sensor 12S.

In addition, as described above, under various conditions under which the intensity of the laser light, the flying amount of the magnetic head 12, and the like are changed, while the laser light is emitted, the magnetic head 12 is scanned in a manner of performing a seek operation, for example, and the size of the unevenness OB after heating using the laser light and the near-field light is measured, so that the flattening condition of the unevenness OB can be optimized.

Among the various pieces of processing described above, the unevenness measurement with respect to the magnetic disk 10 in the initial state, the optimization of the flattening condition of the unevenness OB, and the optimization of the measurement condition of the HDI sensor 12S can be performed, for example, at the design stage of the magnetic disk device 1 or at the time of pre-shipment inspection.

In addition, the unevenness measurement with respect to the magnetic disk 10 in the initial state is preferably performed for each track or each zone for each of the plurality of magnetic disks 10 included in the magnetic disk device 1. In addition, it is preferable that the flattening condition of the unevenness OB is optimized each time at least for each magnetic disk device 1. This is because, since the magnetic disk 10 and other specifications are different for each magnetic disk device 1, appropriate conditions for flattening the unevenness OB may also be different.

The unevenness measurement result of the magnetic disk 10 in the initial state, the flattening condition of the unevenness OB, and the measurement condition of the HDI sensor 12S acquired in advance are stored in, for example, the memory 70 (see FIG. 1) of the magnetic disk device 1. The MPU 60 of the magnetic disk device 1 appropriately reads these pieces of information to monitor the formation status of the unevenness OB and perform flattening In order to monitor the formation status of the unevenness OB, the magnetic disk device 1 of the embodiment first calculates and monitors the duty ratio for each track of the magnetic disk 10. The duty ratio is a time ratio of data write per unit time in a predetermined track.

Figure 6A:
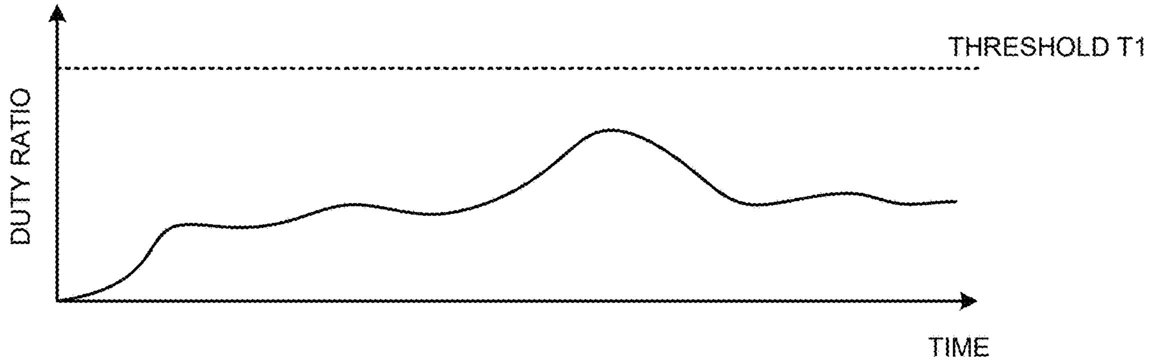
FIGS. 6A to 6C are graphs illustrating measurement results of a duty ratio acquired by the magnetic disk device according to the embodiment.
Figure 6B:
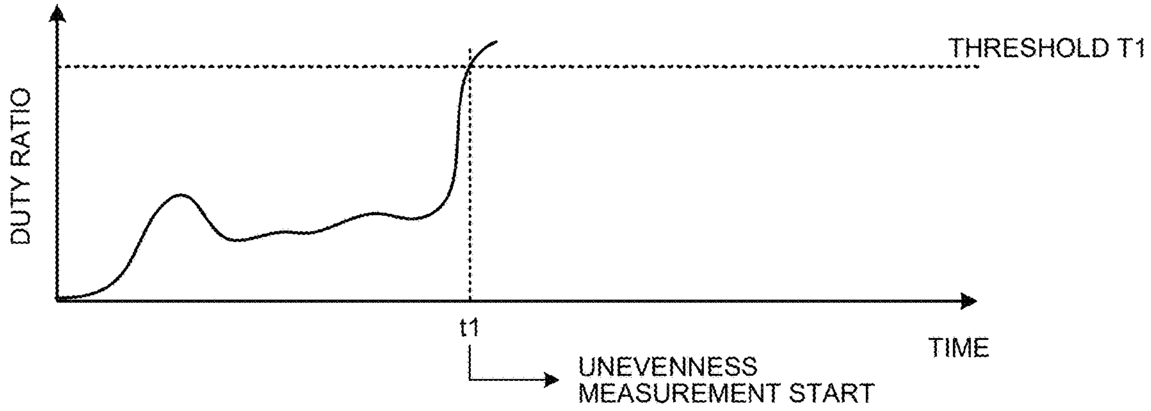
Figure 6C:
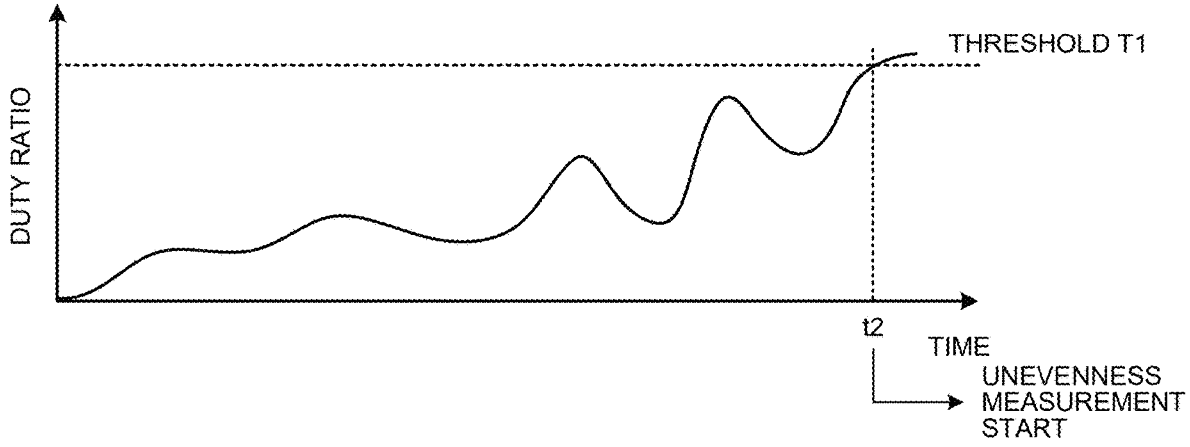

FIGS. 6A to 6C are graphs illustrating measurement results of a duty ratio acquired by the magnetic disk device 1 according to the embodiment. The horizontal axis of the graph represents time, and the vertical axis represents a duty ratio.

As illustrated in FIGS. 6A to 6C, in the magnetic disk device 1 of the embodiment, the R/W control unit 61 of the MPU 60 causes the magnetic head 12 to perform various processing such as data write and data read in accordance with a command or the like from the host 200.

On the other hand, the R/W control unit 61 calculates a duty ratio that is a time ratio of the data write performed per unit time for each track. An upper limit threshold T1 is set in advance for the duty ratio, and the R/W control unit 61 monitors whether or not the duty ratio exceeds the threshold T1 for each track.

In the example illustrated in FIG. 6A, the duty ratio transitions at a value less than the threshold T1 at each time. In this case, the magnetic disk device 1 continues the monitoring of the duty ratio for the track.

In the example illustrated in FIG. 6B, the duty ratio is equal to or greater than the threshold T1 at time t1. In addition, in the example illustrated in FIG. 6C, the duty ratio is equal to or greater than the threshold T1 at time t2.

In this case, after time t1 in the example of FIG. 6A, and after time t2 in the example of FIG. 6B, the magnetic disk device 1 starts the size measurement of the unevenness OB by the HDI sensor 12S for these tracks. More specifically, on the basis of the result of the size measurement of the unevenness OB by the HDI sensor 12S, monitoring of the deviation amount from the reference height at the corresponding portion of the magnetic disk 10 is started as described above.

Figure 7A:
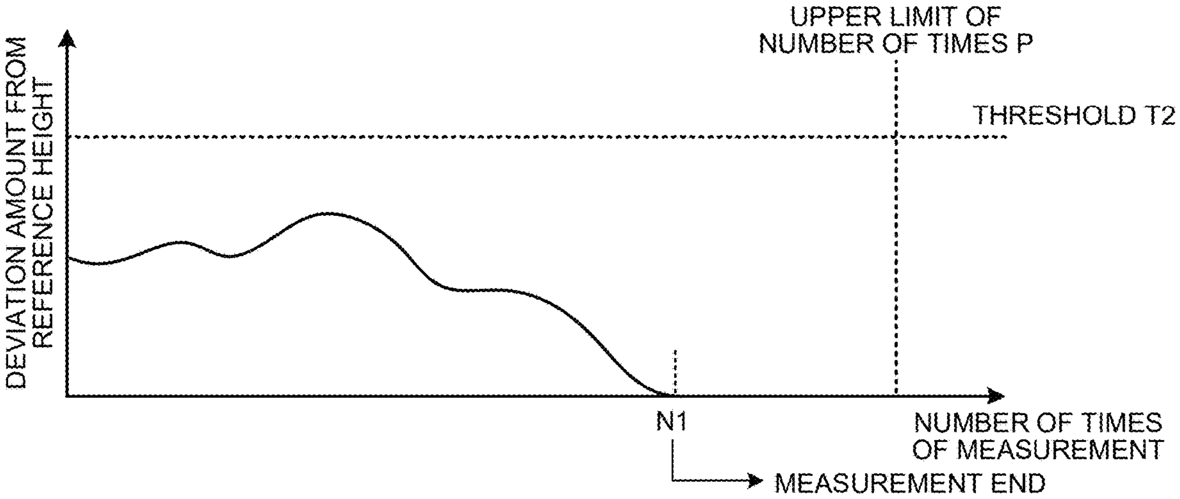
FIGS. 7A to 7C are graphs illustrating a deviation amount from a reference height in a corresponding region of the magnetic disk acquired by the magnetic disk device according to the embodiment.
Figure 7B:
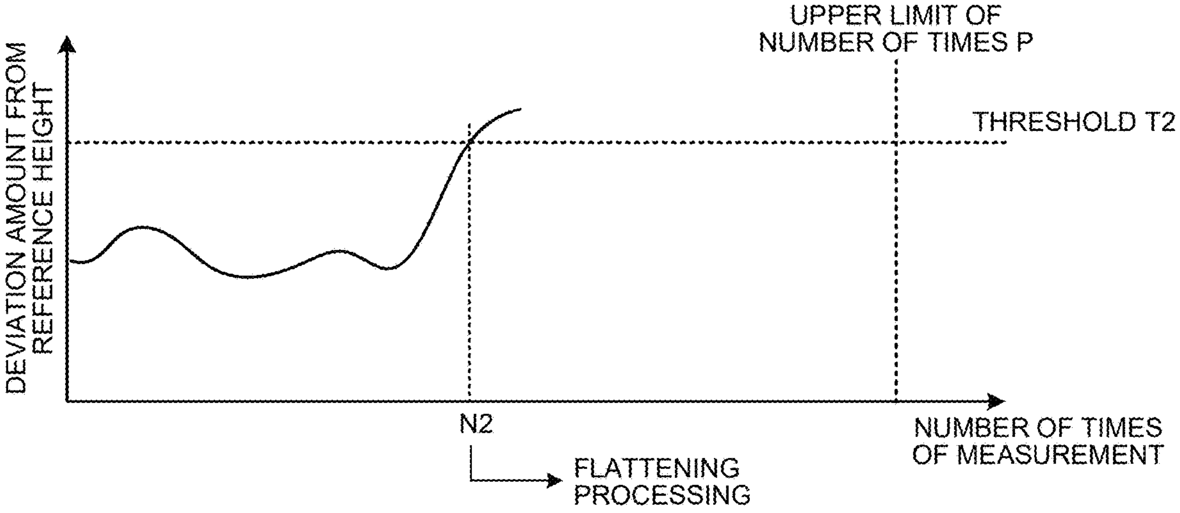
Figure 7C:
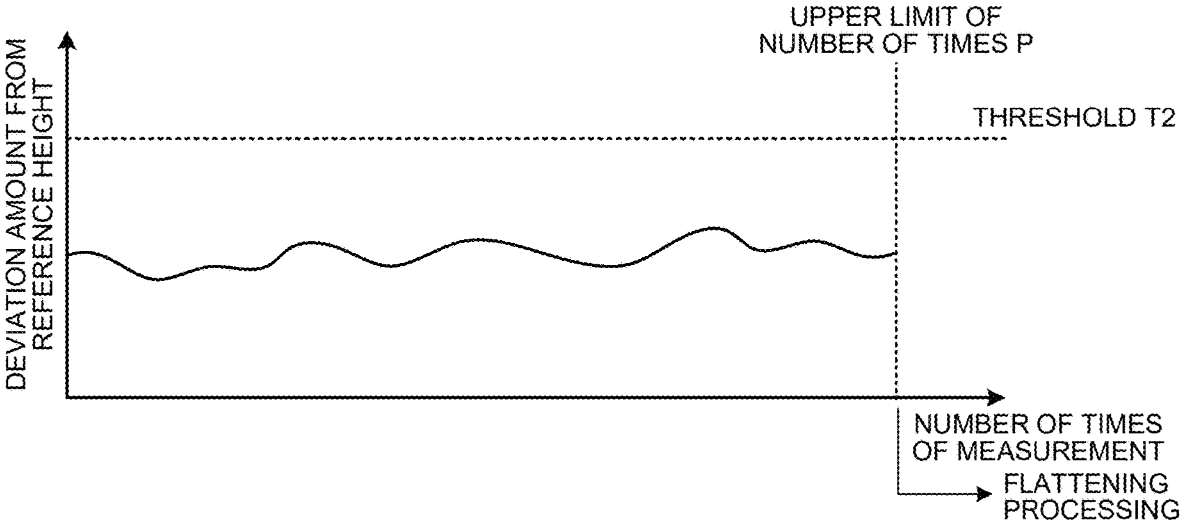

FIGS. 7A to 7C are graphs illustrating a deviation amount from a reference height in a corresponding region of the magnetic disk 10 acquired by the magnetic disk device 1 according to the embodiment. The horizontal axis of the graph represents the number of times of measurement of the size of the unevenness OB, and the vertical axis represents the deviation amount from the reference height.

As illustrated in FIGS. 7A to 7C, in the magnetic disk device 1 of the embodiment, the sensor control unit 63 of the MPU 60 performs the size measurement of the unevenness OB using the HDI sensor 12S over a plurality of times at predetermined intervals with respect to the track in which the duty ratio, which is the time ratio of the data write performed per unit time, exceeds the threshold T1. Also at this time, in order to maximize the sensitivity of the HDI sensor 12S, the flying amount of the magnetic head 12 is controlled to an appropriate value. In addition, the interval of the size measurement of the unevenness OB can be, for example, every 10 minutes.

The sensor control unit 63 refers to the memory 70 and the like, and acquires the unevenness measurement result in the initial state in a measurement target track. In addition, the sensor control unit 63 subtracts the unevenness measurement result in the initial state from the measurement value acquired this time, that is, the unevenness measurement result of the track after the duty ratio exceeds the threshold T1, and estimates the deviation amount from the reference height of the current track.

In addition, an upper limit threshold T2 is set in advance for the deviation amount from the reference height. In addition, the upper limit of the number of times P, which is the upper limit of the number of times of measurement for continuing the measurement from the start of the size measurement of the unevenness OB, is set in advance. The sensor control unit 63 monitors whether or not the deviation amount estimated as described above exceeds the threshold T2 for the measurement target track until the number of times of measurement reaches the upper limit of the number of times P at the maximum.

In the example illustrated in FIG. 7A, the deviation amount from the reference height transitions at a value less than the threshold T2 at each measurement time, and the deviation amount becomes zero at the N1-st measurement before reaching the upper limit of the number of times P. That is, the unevenness OB newly generated by data write disappears at the N1-st measurement. In this case, the magnetic disk device 1 ends the size measurement of the unevenness OB with respect to the track at the N1-st measurement.

In the example illustrated in FIG. 7B, the deviation amount from the reference height is equal to or greater than the threshold T2 at the N2-nd measurement. In this case, after flattening the unevenness OB, the magnetic disk device 1 ends the size measurement of the unevenness OB with respect to the track.

In the example illustrated in FIG. 7C, the deviation amount from the reference height transitions at a value less than the threshold T2 at each measurement time, and the number of times of measurement reaches the upper limit of the number of times P. In this case as well, after flattening the unevenness OB, the magnetic disk device 1 ends the size measurement of the unevenness OB with respect to the track. In this case, the upper limit of the number of times P of the size measurement of the unevenness OB can be set to, for example, 18 times.

Note that, in the examples of FIGS. 7A to 7C, the size of the unevenness OB is treated as the absolute value of the deviation amount from the reference height regardless of whether the recess is generated by data write or the protrusion is generated by data write. However, the above processing may be performed after distinguishing between the case where the recess is generated by data write and the case where the protrusion is generated by data write.

That is, as an example, in a case where the recess is generated by data write, the deviation amount from the reference height may be treated as a negative value, and in a case where the protrusion is generated by data write, the deviation amount from the reference height may be treated as a positive value to distinguish them. In addition, in this case, the upper limit threshold T2 of the deviation amount, the upper limit of the number of times of measurement, and the like may be made different between the case where the deviation amount from the reference height is negative and the case where the deviation amount from the reference height is positive.

Figure 8A:
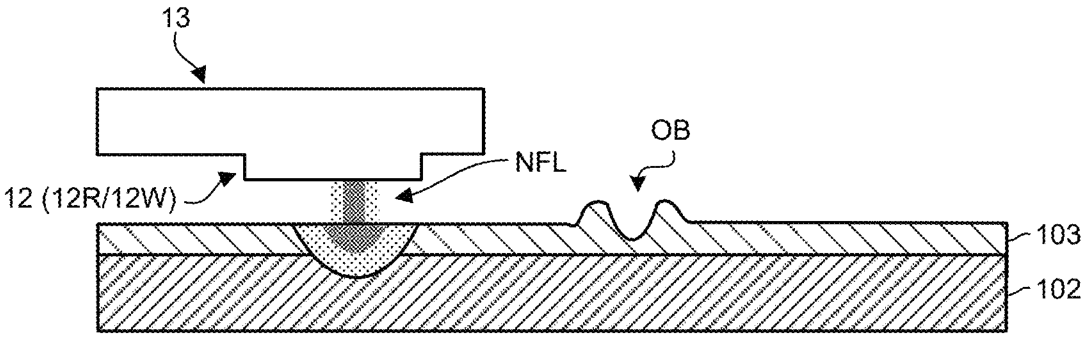
FIGS. 8A to 8C are schematic diagrams illustrating an example of a flattening operation of the magnetic disk executed by the magnetic disk device according to the embodiment.
Figure 8B:
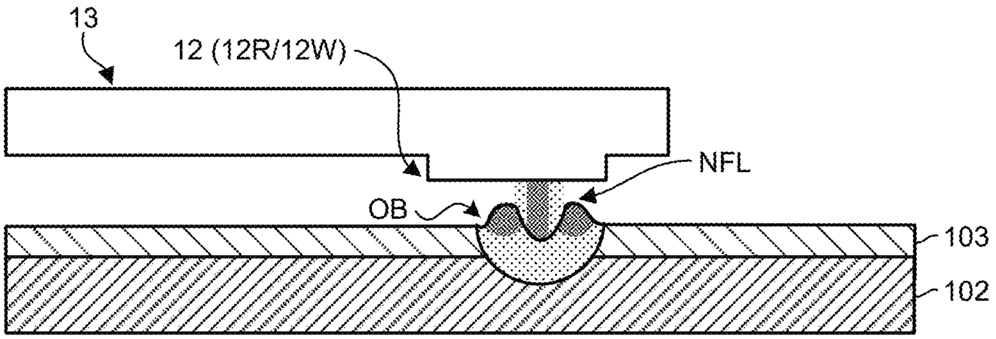
Figure 8C:
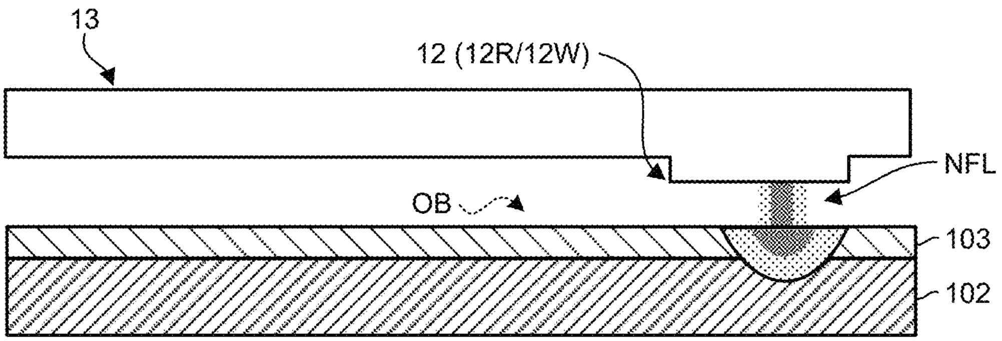

FIGS. 8A to 8C are schematic diagrams illustrating an example of a flattening operation of the magnetic disk 10 executed by the magnetic disk device 1 according to the embodiment.

As illustrated in FIG. 8A, in the magnetic disk device 1 of the embodiment, the driver IC 20 controls the voice coil motor 14 to scan, with the magnetic head 12, the region of the magnetic disk 10 including the portion where the unevenness OB having a size equal to or greater than the threshold T2 is formed. In addition, in parallel with this, the assist power control unit 62 supplies assist power to the laser diode 125 to emit laser light, and causes the near-field light generation element 127 to generate the near-field light NFL.

At this time, the assist power control unit 62 and the driver IC 20 perform scanning and heating of the target region of the magnetic disk 10 with the laser light intensity and the flying amount of the magnetic head 12 optimized in advance with reference to the memory 70 or the like.

As illustrated in FIG. 8B, when the magnetic head 12 passes over the region where the unevenness OB is generated, the unevenness OB is also heated by the generated near-field light NFL.

As illustrated in FIG. 8C, after the magnetic head 12 passes over, the unevenness OB of at least a predetermined size or more disappears, and the corresponding portion of the magnetic disk 10 is flattened. That is, in the actual control, the unevenness of the surface of the magnetic disk 10 after the flattening processing is measured, and when the size of the unevenness OB is equal to or less than a predetermined value, the magnetic disk 10 is assumed to be flattened.

Thus, the flattening control of the surface of the magnetic disk 10 by the magnetic disk device 1 of the embodiment ends.

(Method for Controlling Magnetic Disk Device)

Figure 9:
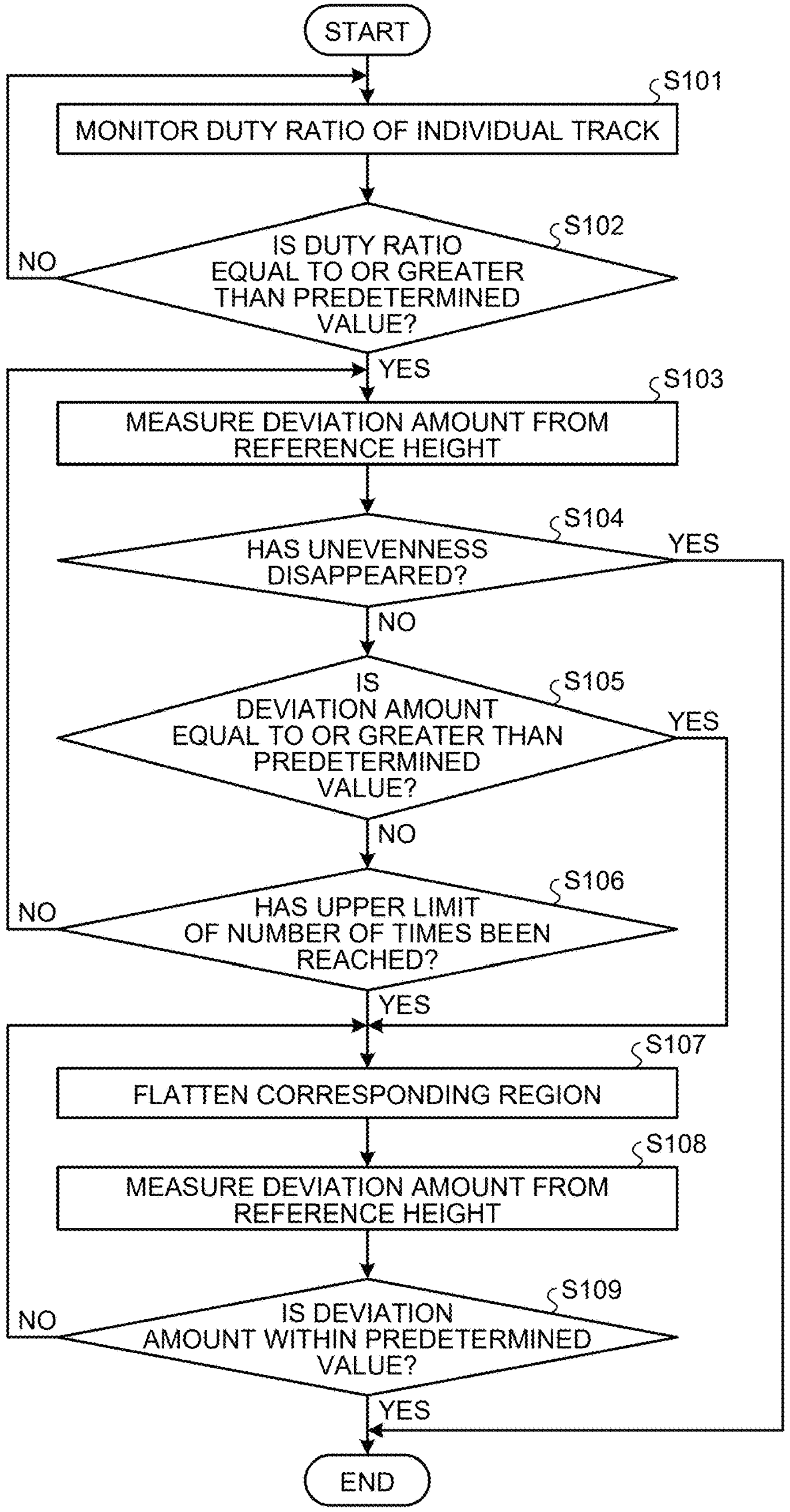
FIG. 9 is a flowchart illustrating an example of a procedure of flattening control processing of the magnetic disk by the magnetic disk device according to the embodiment.

Next, an example of the flattening control processing of the magnetic disk 10 in the magnetic disk device 1 of the embodiment will be described with reference to FIG. 9. FIG. 9 is a flowchart illustrating an example of a procedure of flattening control processing of the magnetic disk 10 by the magnetic disk device 1 according to the embodiment.

As illustrated in FIG. 9, the R/W control unit 61 of the MPU 60 included in the magnetic disk device 1 monitors the duty ratio in each track (step S101), and appropriately determines whether there is a track in which the duty ratio is equal to or greater than the predetermined threshold T1 (step S102). When there is no track in which the duty ratio is equal to or greater than the threshold T1 (step S102: No), the R/W control unit 61 continues monitoring of the duty ratio (step S101).

In a case where the duty ratio is equal to or greater than the threshold T1 in the predetermined track (step S102: Yes), the sensor control unit 63 of the MPU 60 controls the HDI sensor 12S to start the size measurement of the unevenness OB in the track and start monitoring the deviation amount from the reference height in the corresponding region (step S103).

After start of the size measurement of the unevenness OB, the sensor control unit 63 appropriately determines whether the unevenness OB has disappeared, for example, whether the deviation amount obtained from the measurement result is less than a predetermined value (step S104), and when the unevenness OB has not disappeared (step S104: No), the sensor control unit 63 determines whether the deviation amount from the reference height is equal to or greater than the predetermined threshold T2 (step S105).

In the size measurement of the unevenness OB, in a case where the disappearance of the unevenness OB is recognized (step S104: Yes), the magnetic disk device 1 ends the processing.

When the unevenness OB does not disappear (step S104: No) and the deviation amount from the reference height is less than the threshold T2 (step S105: No), the sensor control unit 63 determines whether the number of times of measurement has reached the upper limit of the number of times P (step S106). While the upper limit of the number of times P has not been reached (step S106: No), the sensor control unit 63 continues the size measurement of the unevenness OB and the monitoring of the deviation amount (step S103).

In a case where the deviation amount from the reference height is not equal to or greater than the threshold T2 (step S105: No) and the number of times of measurement reaches the upper limit of the number of times P (step S106: Yes), the magnetic disk device 1 ends the size measurement of the unevenness OB in the track.

Before the number of times of measurement reaches the upper limit of the number of times P (step S106: No), when the deviation amount from the reference height becomes equal to or greater than the threshold T2 (step S105: Yes), or when the deviation amount does not become equal to or greater than the threshold T2 (step S105: No), and when the number of times of measurement reaches the upper limit of the number of times P (step S106: Yes), the processing proceeds to the flattening processing of step S107.

In the flattening processing, the MPU 60 scans the region including the unevenness OB with the magnetic head 12, and flattens the unevenness OB by heating using laser light and near-field light (step S107). In addition, the sensor control unit 63 of the MPU 60 controls the HDI sensor 12S to perform size measurement of the unevenness OB in the track after the flattening processing and check the deviation amount from the reference height (step S108), and determines whether or not the deviation amount from the reference height is at least less than a predetermined value, such as disappearance of the unevenness OB (step S109).

When the deviation amount from the reference height in the corresponding region is not within the predetermined value by the flattening processing of the unevenness OB (step S109: No), the MPU 60 repeats the flattening processing of the unevenness OB (step S107).

In a case where the deviation amount from the reference height is within the predetermined value (step S109: Yes), the MPU 60 ends the flattening processing of the unevenness OB.

Thus, the flattening control processing of the magnetic disk 10 by the magnetic disk device 1 of the embodiment ends.

(Overview)

A technique for increasing the bit density of a magnetic disk using a medium having high thermal magnetic stability is known. In this case, at the time of write, for example, there is a case where a thermal assist method is used in which the writing region of the magnetic disk is locally heated using near-field light or the like to temporarily weaken the coercive force of the medium and write data.

However, in the magnetic disk device using the thermal assist method, there is a case where unevenness is generated on the surface of the magnetic disk due to heating of the magnetic disk. When such unevenness is left, there is a concern that the operation of the magnetic disk device is affected, and thus, for example, it is conceivable to appropriately perform the flattening processing.

On the other hand, the unevenness generated on the surface of the magnetic disk can be enlarged or reduced according to the frequency and interval of data write in the portion, the time required for data write, and the like. Accordingly, it is preferable that the flattening processing is appropriately performed as necessary after the size of the unevenness is accurately estimated.

With the magnetic disk device 1 of the embodiment, the MPU 60 measures the deviation amount from the reference height of the surface of the magnetic disk 10 for each predetermined time with respect to the track in which the duty ratio, which is a time ratio at which data write is performed per unit time, is equal to or greater than the predetermined threshold T1 among the plurality of tracks.

As described above, the size of the unevenness OB changes as appropriate according to the situation of the data write of each track, and the unevenness OB may naturally disappear without requiring a measure such as flattening. Accordingly, first, by monitoring the duty ratio for each track, it is possible to select a track that requires more detailed monitoring such as size measurement of the unevenness OB.

In addition, for the track selected on the basis of the monitor of the duty ratio, by periodically performing the size measurement of the unevenness OB and monitoring of the deviation amount from the reference height, it is possible to appropriately determine the necessity of a measure such as flattening and the timing thereof.

With the magnetic disk device 1 of the embodiment, the MPU 60 flattens the surface of the magnetic disk 10 when the deviation amount from the reference height in the corresponding region becomes equal to or greater than the predetermined threshold T2. As a result, it is possible to suppress the occurrence of a failure in the magnetic disk device 1 due to an excessive increase in the unevenness OB.

As described above, with the above configuration, it is possible to estimate the size of the unevenness OB caused by the heat at the time of data write and take measures.

With the magnetic disk device 1 of the embodiment, in the case of measuring the deviation amount from the reference height every predetermined time described above, the MPU 60 ends the measurement of the deviation amount from the reference height when the deviation amount becomes equal to or less than a predetermined size smaller than the size at the start of measurement. As a result, it is possible to appropriately cope with a case where the unevenness OB naturally disappears.

With the magnetic disk device 1 of the embodiment, in a case where the deviation amount from the reference height is measured every predetermined time described above, the MPU 60 flattens the surface of the magnetic disk 10 even in a case where the deviation amount does not reach the threshold T2 or more, does not reach the predetermined value or less, and the number of times of measurement reaches the upper limit of the number of times P. As a result, it is possible to appropriately cope with the unevenness OB that can exhibit various behaviors.

With the magnetic disk device 1 of the embodiment, the MPU 60 measures the deviation amount from the reference height from the result of sensing the surface of the magnetic disk 10 with the HDI sensor 12S. In this way, by using the HDI sensor 12S, the size of the unevenness OB can be precisely measured.

In addition, the HDI sensor 12S is originally provided in the magnetic disk device 1 in order to optimize the flying amount of the magnetic head 12 by pre-shipment inspection or the like. Accordingly, in measuring the deviation amount from the reference height, it is not necessary to newly provide a measurement device or the like in the magnetic disk device 1, and the device cost can be suppressed.

With the magnetic disk device 1 of the embodiment, the MPU 60 acquires in advance the result of sensing the surface of the magnetic disk 10 in the initial state by the HDI sensor 12S for each of a plurality of tracks or for each of a plurality of zones, and estimates the deviation amount from the reference height based on the difference between the result at the time of measurement after data write and the result in the initial state. Thus, the size of the unevenness OB can be measured more precisely.

With the magnetic disk device 1 of the embodiment, in a case where the result of the unevenness measurement of the magnetic disk 10 in the initial state is acquired for each of a plurality of tracks, the MPU 60 estimates the deviation amount from the reference height based on the difference between the result at the time of measurement for the track in which the duty ratio is equal to or greater than the threshold T1 and the result of the unevenness measurement in the initial state. Thus, the size of the unevenness OB can be measured even more precisely.

With the magnetic disk device 1 of the embodiment, in a case where the result of the unevenness measurement of the magnetic disk 10 in the initial state is acquired for each of a plurality of zones, the MPU 60 estimates the deviation amount from the reference height based on the difference between the result at the time of measurement for the track in which the duty ratio is equal to or greater than the threshold T1 and the result of the unevenness measurement in the initial state for the zone to which the track in which the duty ratio is equal to or greater than threshold T1 belongs. Thus, the unevenness measurement in the initial state can be simplified, and the initial data can be more efficiently acquired.

With the magnetic disk device 1 of the embodiment, when acquiring the unevenness of the magnetic disk 10 in the initial state and after data write with the HDI sensor 12S, the MPU 60 supplies electric power to the heaters 128*w* and 128*r* at a predetermined ratio to adjust the flying amount of the magnetic head 12.

With the magnetic disk device 1 of the embodiment, the MPU 60 determines in advance the appropriate value of the flying amount of the magnetic head 12 when the unevenness of the magnetic disk 10 in the initial state and after data write is acquired with the HDI sensor 12S based on the result of measuring the state of being deviated in a pseudo manner from the reference height in a state where the surface of the magnetic disk 10 in the initial state is deviated in a pseudo manner and in a state where different electric power is supplied to the heaters 128*w* and 128*r* at different ratios to make the flying amount of the magnetic head 12 different. Thus, the size of the unevenness OB can be estimated more precisely.

With the magnetic disk device 1 of the embodiment, the MPU 60 supplies assist power to the laser diode 125 to heat the corresponding portion of the track at a temperature lower than that at the time of data write, thereby flattening the surface of the magnetic disk 10. By such a method, the magnetic disk 10 can be flattened to such an extent that the unevenness OB is removed and an operational failure does not occur in the magnetic disk device 1.

With the magnetic disk device 1 of the embodiment, the MPU 60 determines in advance an appropriate value of the assist power to be supplied to the laser diode 125 when flattening the surface of the magnetic disk 10 by supplying different assist power to the laser diode 125 to heat the surface of the magnetic disk 10 in a state where the surface of the magnetic disk 10 in the initial state deviates in a pseudo manner. Thus, the unevenness OB can be more reliably and efficiently flattened.

With the magnetic disk device 1 of the embodiment, the MPU 60 also determines an appropriate value of the flying amount of the magnetic head 12 when flattening the surface of the magnetic disk 10 when determining an appropriate value of the assist power to be supplied to the laser diode 125 when flattening the surface of the magnetic disk 10. Thus, the unevenness OB can be even more reliably and efficiently flattened.

With the magnetic disk device 1 of the embodiment, the MPU 60 determines an appropriate value of the flying amount of the magnetic head 12 when flattening the surface of the magnetic disk 10 by varying the electric power value and the electric power ratio and supplying electric power to the heaters 128*w* and 128*r* to change the flying amount of the magnetic head 12. This makes it possible to optimize the flying amount of the magnetic head 12 when flattening the unevenness OB.

With the magnetic disk device 1 of the embodiment, in the case of measuring the deviation amount from the reference height every predetermined time described above, the MPU 60 ends the measurement of the deviation amount from the reference height when the deviation amount becomes equal to or less than a predetermined size smaller than the size at the start of measurement. As a result, it is possible to appropriately cope with a case where the unevenness OB naturally disappears.

Note that, in the above-described embodiment, the track in which the duty ratio is equal to or greater than the predetermined threshold T1 is measured for the unevenness OB, and the flattening processing is performed as necessary. However, in a case where the duty ratio is equal to or greater than the threshold T1 in a predetermined track, not only the track but also one or a plurality of tracks adjacent to the track may be subjected to the measurement of the unevenness OB and the monitoring of the deviation amount from the reference height in the track(s), and the flattening processing may be performed as necessary.

In this case, the tracks to be measured for the unevenness OB may be several tracks including a track in which the duty ratio is equal to or greater than the predetermined threshold T1.

In addition, in the tracks other than the track in which the duty ratio is equal to or greater than the predetermined threshold T1, the size measurement of the unevenness OB and the monitoring of the deviation amount may be performed at predetermined time intervals similar to those of the track in which the duty ratio is equal to or greater than the predetermined threshold T1, or the measurement may be performed at time intervals longer than the predetermined time, so that the measurement frequency may be reduced as compared with that of the track in which the duty ratio is equal to or greater than the predetermined threshold T1.

In addition, in the tracks other than the track in which the duty ratio is equal to or greater than the predetermined threshold T1, the threshold of the deviation amount from the reference height serving as the determination reference as to the necessity of the flattening processing may be the threshold T2 similar to that of the track in which the duty ratio is equal to or greater than the predetermined threshold T1, or may be a different threshold.

In addition, in the tracks other than the track in which the duty ratio is equal to or greater than the predetermined threshold T1, the value of the deviation amount when estimating that the unevenness OB has disappeared may be the same size as that of the track in which the duty ratio is equal to or greater than the predetermined threshold T1, or may be a different size.

In addition, in the tracks other than the track in which the duty ratio is equal to or greater than the predetermined threshold T1, the upper limit of the number of times of the size measurement of the unevenness OB and the monitor of the deviation amount may be the same upper limit of the number of times P as in the track in which the duty ratio is equal to or greater than the predetermined threshold T1, or may be the number of times smaller than the upper limit of the number of times P.

In addition, in a case where the flattening processing is required in any of several tracks including a track in which the duty ratio is equal to or greater than the predetermined threshold T1, the flattening processing may be performed only on the track, or the flattening processing may be performed on a plurality of tracks including the track and at least a track in which the duty ratio is equal to or greater than the predetermined threshold T1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device in which data write is performed by a thermal assist method, the magnetic disk device comprising:

a magnetic disk that includes a plurality of tracks; and a controller that controls the magnetic disk device, wherein the controller measures, every first period, a deviation amount from a reference height of a surface of the magnetic disk with respect to a track in which a duty ratio is equal to or greater than a predetermined value, the duty ratio being a time ratio at which data write is performed per unit time, among the plurality of tracks, and flattens the surface of the magnetic disk in a case where the deviation amount becomes equal to or greater than a first value.

2. The magnetic disk device according to claim 1, wherein the controller ends measurement of the deviation amount when the deviation amount becomes equal to or less than a second value smaller than a value at start of the measurement in a case where the deviation amount is measured every first period.

3. The magnetic disk device according to claim 2, wherein the controller flattens the surface when the deviation amount does not reach the first value or more or does not reach the second value or less, and a number of times of measurement reaches a first number of times in a case where the deviation amount is measured every first period.

4. The magnetic disk device according to claim 1, further comprising:

a magnetic head that performs data write on the magnetic disk, wherein the magnetic head includes a resistance type temperature sensor, and the controller measures the deviation amount from a first result obtained by sensing the surface of the magnetic disk by the resistance type temperature sensor.

5. The magnetic disk device according to claim 4, wherein the controller acquires in advance a second result obtained by sensing the surface of the magnetic disk in an initial state with the resistance type temperature sensor for each of the plurality of tracks or for each of a plurality of zones grouped for a predetermined number of tracks among the plurality of tracks, and sets the second result as the reference height for each of the plurality of tracks or for each of the plurality of zones, and estimates the deviation amount from a difference between the first result and the second result.

6. The magnetic disk device according to claim 5, wherein the controller in a case where the second result is acquired for each of the plurality of tracks, estimates the deviation amount based on a difference between the first result and the second result for a track in which the duty ratio is equal to or greater than the predetermined value, and in a case where the second result is acquired for each of the plurality of zones, estimates the deviation amount based on a difference between the first result for a track in which the duty ratio is equal to or greater than the predetermined value and the second result for a zone to which the track in which the duty ratio is equal to or greater than the predetermined value belongs among the plurality of zones.

7. The magnetic disk device according to claim 5, wherein the magnetic head includes first and second heaters that are provided to be spaced apart from each other in the magnetic head in a direction along the magnetic disk, and are capable of adjusting a flying amount of the magnetic head that is a distance of the magnetic head from the magnetic disk by thermally expanding the magnetic head, and when acquiring the first and second results with the resistance type temperature sensor, the controller supplies electric power to the first and second heaters at a predetermined ratio to adjust the flying amount of the magnetic head.

8. The magnetic disk device according to claim 7, wherein the controller forms a pseudo deviation of the surface of the magnetic disk in the initial state from the reference height, measures the pseudo deviation by supplying different electric power to the first and second heaters at different ratios to make the flying amount of the magnetic head different, and based on a result of measuring the pseudo deviation, determines in advance an appropriate value of the flying amount of the magnetic head when acquiring the first and second results with the resistance type temperature sensor.

9. The magnetic disk device according to claim 1, further comprising:

an assist mechanism that heats the magnetic disk, wherein the controller flattens the surface of the magnetic disk by supplying assist power to the assist mechanism and heating a corresponding portion of the track at a temperature lower than a temperature at time of data write.

10. The magnetic disk device according to claim 9, wherein the magnetic disk includes a substrate, a recording layer that is provided on the substrate, and a lubricant that covers the recording layer.

11. The magnetic disk device according to claim 9, wherein the controller forms a pseudo deviation of the surface of the magnetic disk in the initial state from the reference height, determines in advance an appropriate value of the assist power to be supplied to the assist mechanism when flattening the surface of the magnetic disk based on an elimination speed of the pseudo deviation while supplying different assist power to the assist mechanism and heating the surface of the magnetic disk, and supplies the assist power based on the appropriate value to the assist mechanism when flattening the surface.

12. The magnetic disk device according to claim 11, further comprising a magnetic head that performs data write on the magnetic disk, wherein the assist mechanism is provided in the magnetic head, and when determining the appropriate value of the assist power, the controller determines an appropriate value of a flying amount of the magnetic head that is a distance of the magnetic head from the magnetic disk at time of flattening the surface, and supplies the assist power based on the appropriate value of the assist power to the assist mechanism while controlling the magnetic head with the flying amount based on the appropriate value of the flying amount when flattening the surface.

13. The magnetic disk device according to claim 12, wherein the magnetic head includes first and second heaters that are provided to be spaced apart from each other in the magnetic head in a direction along the magnetic disk, and are capable of adjusting the flying amount by thermally expanding the magnetic head, and when determining the appropriate value of the flying amount, the controller determines the appropriate value of the flying amount when flattening the surface based on a result of varying an electric power value and an electric power ratio and supplying electric power to each of the first and second heaters to change the flying amount of the magnetic head.

14. The magnetic disk device according to claim 1, wherein the controller measures, every second period, a deviation amount from a reference height of a surface of the magnetic disk with respect to one or more tracks adjacent to the track in which the duty ratio is equal to or greater than the predetermined value in addition to the track, and flattens the surface of the one or more tracks in a case where the deviation amount of the one or more tracks becomes equal to or greater than a third value.

15. The magnetic disk device according to claim 14, wherein the controller ends measurement of the one or more tracks when the deviation amount becomes equal to or less than a fourth value smaller than a value at start of the measurement in a case where the deviation amount is measured every second period.

16. The magnetic disk device according to claim 15, wherein the controller flattens the surface when the deviation amount does not reach the third value or more or does not reach the fourth value or less, and a number of times of measurement reaches a second number of times in a case where the deviation amount is measured every second period.

17. A control method executed in a magnetic disk device in which data write is performed by a thermal assist method, the control method comprising:

measuring, every first period, a deviation amount from a reference height of a surface of a magnetic disk with respect to a track in which a duty ratio is equal to or greater than a predetermined value, the duty ratio being a time ratio at which data write is performed per unit time, among a plurality of tracks included in the magnetic disk; and flattening the surface of the magnetic disk in a case where the deviation amount becomes equal to or greater than a first value.

* * * * *